United States Patent [19]
Snyder

[11] Patent Number: 5,553,174
[45] Date of Patent: Sep. 3, 1996

[54] MONOLITHIC CYLINDRICAL OPTIC

[75] Inventor: James J. Snyder, San Jose, Calif.

[73] Assignee: Blue Sky Research, Incorporated, Santa Cruz, Calif.

[21] Appl. No.: 91,779

[22] Filed: Jul. 14, 1993

Related U.S. Application Data

[63] Continuation-in-part of Ser. No. 20,584, Feb. 22, 1993.

[51] Int. Cl.$^6$ .................................................. G02B 6/26
[52] U.S. Cl. .................................................. 385/15
[58] Field of Search .......................... 385/15, 31, 33, 385/34

[56] References Cited

U.S. PATENT DOCUMENTS

| | | | |
|---|---|---|---|
| 3,829,195 | 8/1974 | Rawson | 385/34 |
| 4,842,360 | 6/1989 | Caro et al. | 385/33 |
| 4,997,251 | 3/1991 | Hofbauer | 385/33 |
| 5,054,018 | 10/1991 | Tremblay | 385/33 X |
| 5,125,064 | 6/1992 | Naselli et al. | 385/33 X |
| 5,221,839 | 6/1993 | Braun | 385/34 X |
| 5,311,611 | 5/1994 | Migliaccio | 385/33 |

*Primary Examiner*—Akm E. Ullah
*Attorney, Agent, or Firm*—Joseph H. Smith

[57] ABSTRACT

A new cylindrical minilens and a new lens system for collimating and circularizing the output beam from a laser diode are provided which can be mounted outside the can of a laser diode. The system is made up of two lens elements. The first lens element is a collimating lens which is located to receive the output beam from the laser diode. The collimating lens is typically a standard small lens used in the art for collimating the output beam on a first axis, such that the output beam when it leaves the collimating lens has a desired amount of collimation and has a desired dimension on a second axis that is orthogonal to the first axis. The second lens element is a cylindrical minilens of new design which is located to receive the output beam from the collimating lens, with the cylindrical minilens configured for changing the size of the output beam such that the output beam has a first desired dimension on the first axis and a desired amount of collimation of the output beam on the second axis, so that the output beam is collimated to a desired amount on each axis and has a desired ellipticity.

12 Claims, 8 Drawing Sheets

MONOLITHIC CYLINDRICAL OPTIC

BACKGROUND OF THE INVENTION

This patent application is a continuation-in-part of U.S. patent application Ser. No. 08/020,584, filed Feb. 22, 1993, now pending entitled MICROLENS ASSEMBLIES AND COUPLERS. This invention relates to an anamorphic mini-telescope which is constructed of a single lens. More particularly, the lens is a pulled lens constructed according to the methods described in application Ser. No. 07/591,462, now U.S. Pat. No. 5,080,706 entitled METHOD AND FABRICATION OF CYLINDRICAL MICROLENSES OF SELECTED SHAPE, by James J. Snyder and Thomas M. Baer. Other related applications include application Ser. No. 07/591,409, now U.S. Pat. No. 5,081,639 entitled LASER DIODE ASSEMBLY INCLUDING A CYLINDRICAL LENS, filed Sep. 18, 1990 by James J. Snyder and Patrick Reichert; and application Ser. No. 07/697,974, now U.S. Pat. No. 5,181,224, entitled MICROPTIC LENSES, by James J. Snyder. All of the above patent applications are hereby incorporated by reference.

In general, one of the characteristics of diode lasers is that the light emanating therefrom is diverging, with one axis diverging very significantly more than the other, so that there is a wide (fast) axis and a narrow (slow) axis to the beam. As a result, the beam is elliptical in shape and diverges rapidly. A partial solution to the divergence problem has been provided by Corning Glass of Ithica, N.Y., which manufactures a line of molded glass aspheric lens, e.g. such as the Corning Code 350150, which substantially collimates the light emanating from a laser diode on both axes at the same time. The resulting beam, however, is still elliptical in cross-section, and more often than not the beam is also astigmatic, i.e. has a different degree of collimation on each axis, since the beam from the laser diode is astigmatic. For some systems, the elliptical cross-section is not a problem. However, for others, a circular cross-section is desired. Although one could obtain a circular cross-section by using a circular stop to block off a portion of the light on the wide axis, such a solution is not particularly attractive, since it would result in a significant loss in the useful power from the diode.

A particularly elegant solution to this problem has been provided by Blue Sky Research, San Jose, Calif., in the Blue Sky Research product called the VPS700 (This product is described generally in the product literature provided with the lens and in the U.S. patent applications referenced above.) That product essentially turns a laser diode into a virtual point source by using a micro-lens in front of a laser diode to cause the light on the slow axis and the fast axis to have both the same divergence and the same dimension, ie. the extreme rays have the same diameter. If a collimated beam is desired, then an axially symmetric collimating lens such as the Corning 350150 can be placed in front of the VPS700.

In the Blue Sky Research solution, the VPS700 microlens is fabricated by pulling an optical blank of the required cross-sectional shape into a very fine fiber, typically less than a millimeter in maximum diameter. The shape and dimensions of the micro-lens are chosen so as to cause both axes of the beam from the laser diode to diverge at the same rate and to have the same dimension, as described above. During the pulling, the cross-sectional shape of the blank is retained as the diameter of the fiber is diminished during the pull. The resulting fiber is then cleaved into easily handled pieces, which are then used as lenses for laser diodes, lenses which are diffraction-limited and have a very small cross-section and a very precise shape.

One difficulty with the VPS700 is the requirement that it be mounted in close proximity to the facet of the laser diode, about 30 microns. To mount it that closely, the package (can) containing the laser diode must be opened or the diode must be provided without the can. In either case, the laser diode is then exposed to the environment, which in many applications is extremely undesirable.

What is needed is a system for use with laser diodes that both collimates and circularizes the beam, without exposing the diode to environmental hazards.

SUMMARY OF THE INVENTION

In accordance with preferred embodiments of the invention, a new cylindrical minilens and a new lens system for collimating and circularizing the output beam from a laser diode are provided which can be mounted outside the can of a laser diode. The system is made up of two lens elements. The first lens element is a collimating lens which is located to receive the output beam from the laser diode. The collimating lens is typically a standard small lens used in the art for collimating the output beam on a first axis, such that the output beam when it leaves the collimating lens has a desired amount of collimation and has a desired dimension on a second axis that is orthogonal to the first axis. The second lens element is a cylindrical minilens of new design which is located to receive the output beam from the collimating lens, with the cylindrical minilens configured for changing the size of the output beam such that the output beam has a first desired dimension on the first axis and a desired amount of collimation of the output beam on the second axis, so that the output beam is collimated to a desired amount on each axis and has a desired ellipticity.

The collimating lens can be located to collimate either the fast axis or the slow axis of the laser diode. Whichever is chosen, the cylindrical minilens is then used to collimate on the other axis.

In a preferred embodiment, the cylindrical minilens used in the lens system is a cylindrical optical fiber having a first surface of negative power traversing a length of the fiber and having a second surface of positive power located opposite said negative surface which also traverses said length of said fiber. Also in a preferred mode, the negative power is larger than the positive power in absolute magnitude. Also in a preferred mode, the cylindrical minilens is a pulled lens and has a maximum cross-sectional dimension of less than 5 mm.

DETAILED DESCRIPTION OF THE PREFERRED EMBODIMENTS

Figure 1:
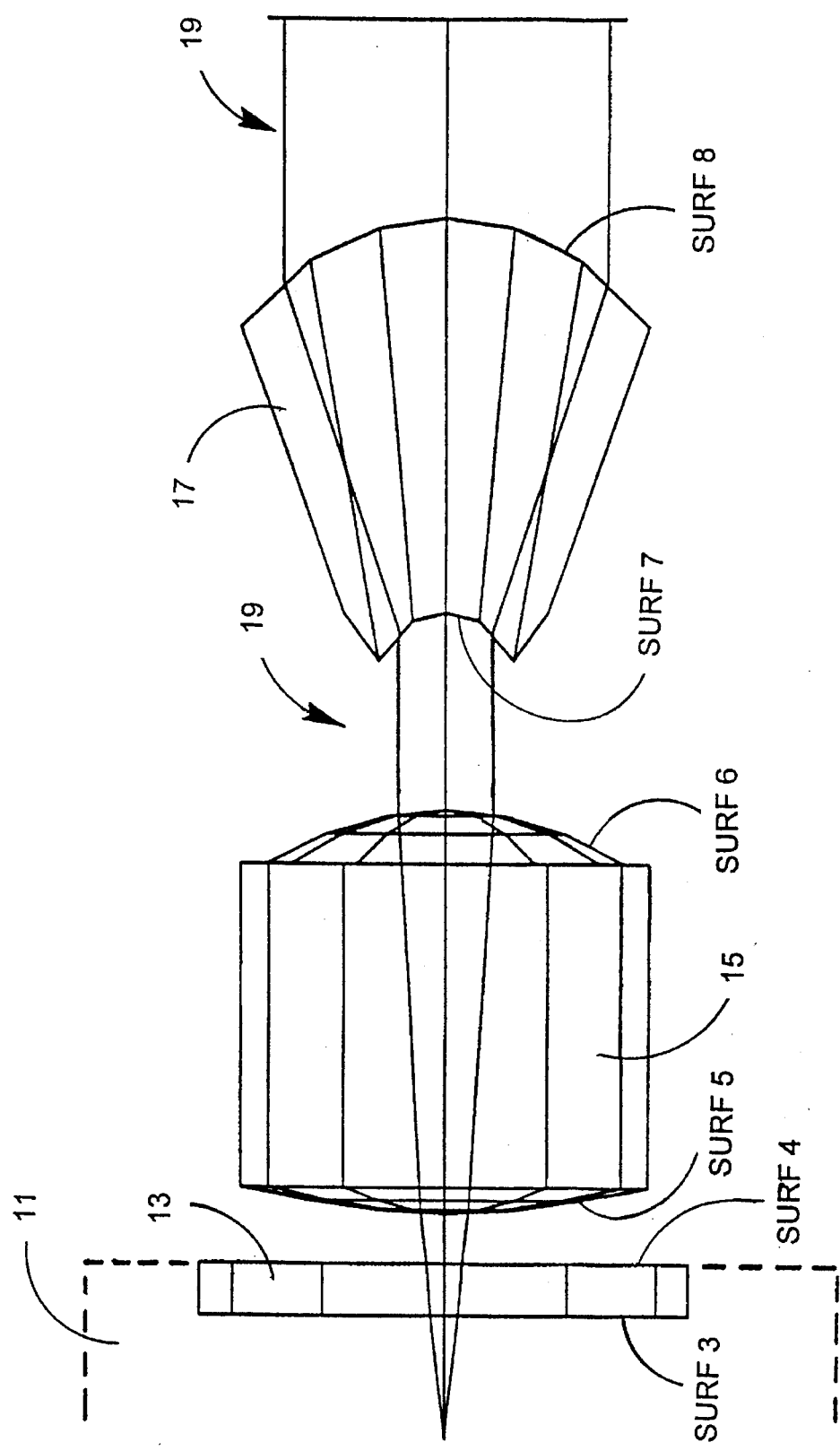
FIG. 1 is a cross-sectional diagram of an external hybrid collimator minilens combination according to the invention.
Figure 2:
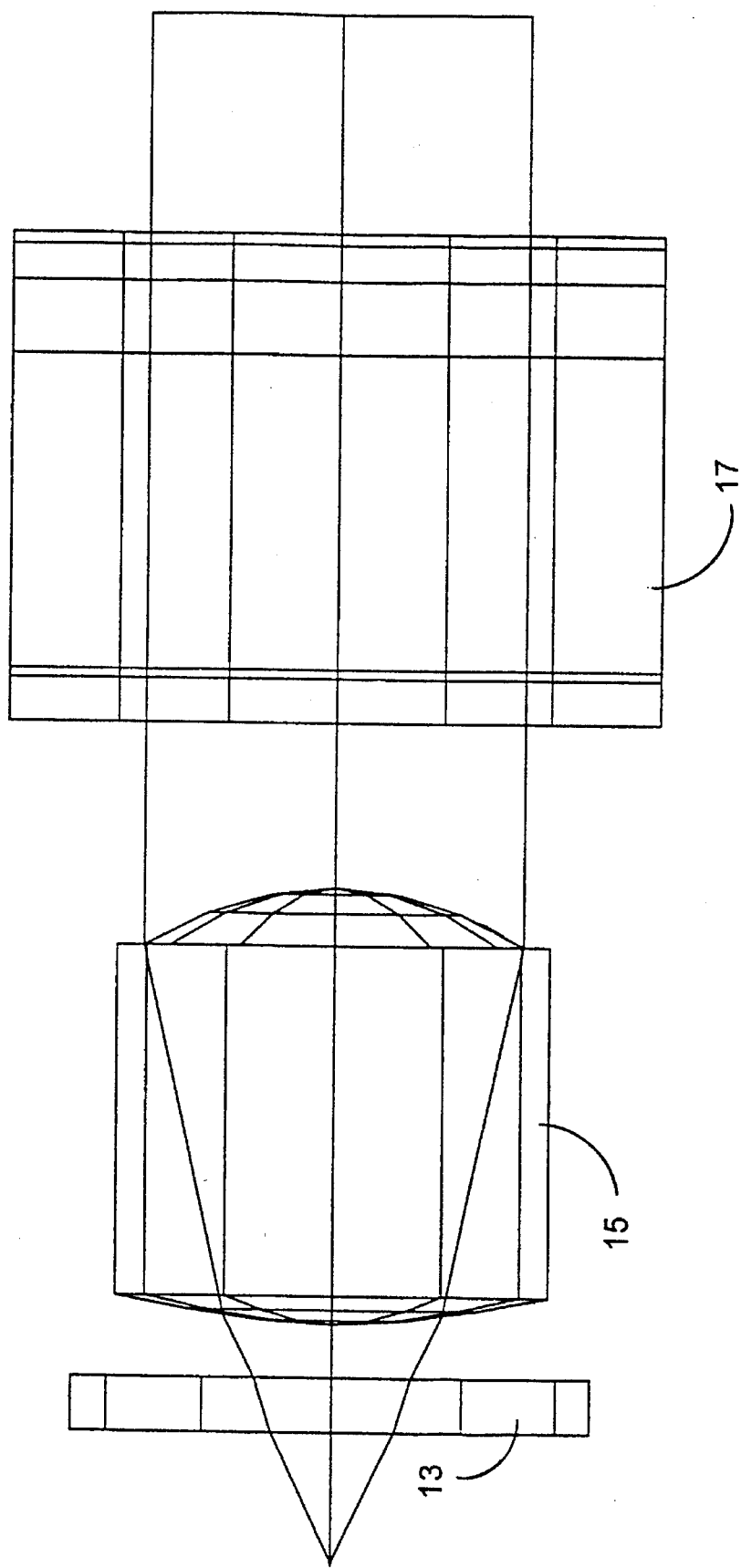
FIG. 2 shows a cross-sectional diagram of the external hybrid collimator minilens combination of FIG. 1 in a plane orthogonal to the plane shown in FIG. 1.
Figure 3:
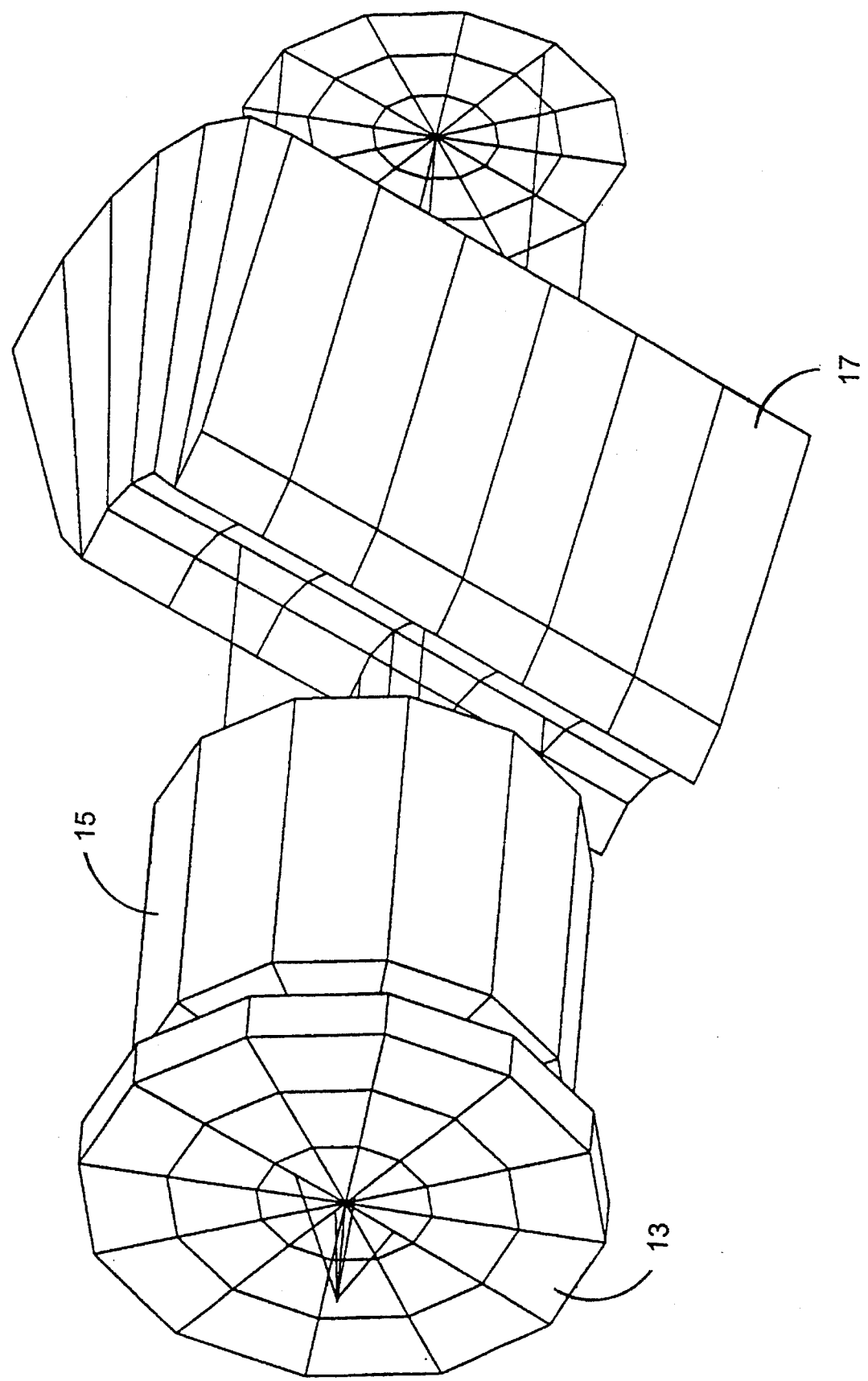
FIG. 3 shows a three dimensional representation of the external hybrid collimator minilens combination of FIG. 1.

Shown in FIG. 1 is a "wire frame" diagram of an external hybrid collimator lens 17 in accordance with the invention, which is shown in cross-section through the plane of the slow axis. (The wire frame diagram will be used in this description since that is the typical presentation method in the art now that computer ray tracing programs have become prevalent.) With the wire frame representation, only the optical surfaces, SURF3 through SURF8, are shown, and the various curved surfaces of optical elements are illustrated as a plurality of facets, which are tangent planes to the curved surface at each point where a ray crosses the curved surface. This can be seen most easily in FIG. 1, where a ray 19 is shown striking the middle of a facet on the first optical surface, SURF7, of lens 17; traversing the lens 17; and exiting a facet on the second optical surface, SURF8, of lens 17. FIG. 2 shows the same apparatus in cross-section through the plane of the fast axis, and FIG. 3 shows a schematic solid model of the system generated by the ray tracing program (known as ZEMAX), which illustrates particularly the cylindrical geometry of lens 17. (The mounting for this combination of lenses is standard in the art and is not shown since it would interfere with understanding the optical characteristics of the system.)

As illustrated, a can 11 (shown in dotted lines), for holding a diode laser has a window 13 so that the laser beam can exit the can. The diode is typically placed inside the can during manufacture, and the can is hermetically sealed to protect the laser diode from the environment. In the preferred mode, a lens 15, which is an aspheric collimating lens, such as that sold by Corning Glass described above, is placed in front of window 13 at a distance so as to collimate as nearly as possible one axis of the laser diode beam, for example the fast axis. Typically in this situation the other axis will not be as well collimated as the one that has been optimized. A lens according to the invention, such as lens 17 having SURF7 which is negative and SURF8 that is positive, is then used to collimate the other (slow) axis while at the same time magnifying it so that the maximum extent of the beam on each axis is the same, ie. the beam is circular. In the preferred mode, the primary radius of curvature of SURF7 is less than the primary radius of curvature of SURF8, i.e. the focal length of SUR7 is much less than the focal length of SURF8, in order to achieve collimation of the beam exiting lens 17. Those skilled in the art will appreciate, however, that in some circumstances complete collimation may not be desired and complete circularization may not be desired. The configuration described is easily adapted to achieve the desired degree of collimation and/or ellipticity.

Lens 17 is a pulled cylindrical lens which is manufactured in accordance with the methods described above in the Background of the Invention. As a result, in practice, lens 17 is typically less than 5 mm in its maximum cross-sectional extent, although it should be possible to make larger pulled lenses, if larger equipment were used in the pulling tower and larger blanks were used in the process. Also, as a practical matter, these minilenses are typically at least 0.5 mm in maximum cross-sectional extent in order to capture all of the light from the asphere. The importance of the fact that the lens is pulled is that no grinding equipment such as that typically used in optical manufacturing is known to the inventor which could be used to grind and/or polish a cylindrical lens which has an acircular surface such as SURF8 using standard techniques.

Lens 17 is essentially a Galilean telescope used in reverse, with SURF7 and SURF8 chosen to have the correct power and separation to achieve the desired magnification to circularize the beam. In practice, since most if not all laser diodes have some astigmatism, it is often desirable that lens 17 be defocussed slightly to compensate for the astigmatism so that the emerging beam is precisely collimated, as well as circular in cross-section.

Those skilled in the art will appreciate that although no two diode lasers are exactly alike, within the specifications of collimation, astigmatism, etc., for a particular model of diode laser, the required lens 15 can be selected from generally available catalogues, and that lens will substantially collimate the beam for all diodes of that model. Different models of laser diode may require a different lens, however. Similarly, for a particular model of laser diode, the surfaces SURF7 and SURF8 will also be specially selected, and different models of laser diode may require different curvatures. Knowing the configuration described above and the specifics of the laser diode to be used, however, provides the necessary input to use a ray tracing program to configure lens 17 for optimal performance.

Those skilled in the art will also appreciate, however, that lens 17 has several degrees of freedom, i.e. two optical surfaces and a separation between them, which can be used to achieve the collimation and the demagnification. Its function is under specified, i.e. the lens has an extra degree of freedom that can be chosen beneficially. In practice, what is done is to determine the maximum diameter of the beam emanating from the asphere, lens 15, and to choose the separation between front surface SURF7 and back surface SURF8 of lens 17 equal to that maximum diameter. That way lens 17 will be substantially square in cross-section, which is very beneficial when pulling the lens. Surfaces SURF7 and SURF8 are then chosen as described above.

Specific Example

Figure 4:
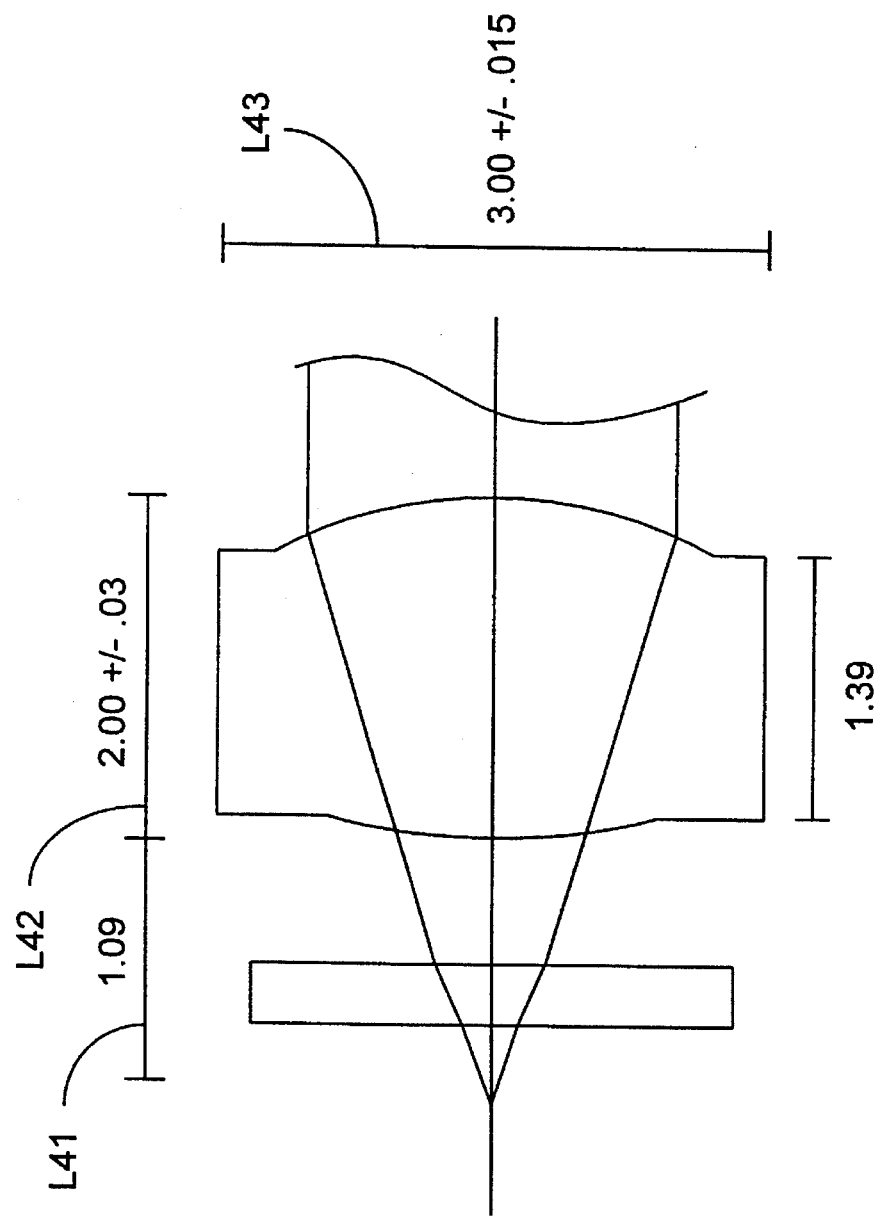
FIG. 4 shows a cross-section of an molded aspheric lens used for collimating laser diodes.

The following provides a description of a lens system design specifically optimized for a visible, low power, laser diode, in particular the TOLD9211, which is available from Toshiba in Japan. The purpose of the design is to provide a prescription for obtaining a fully collimated, fully circularized output beam from the laser diode. Shown in FIG. 4 is a cross-section of a molded glass aspheric lens, Corning Code 350150, which can be used as lens 15. The various dimensions of lens 15 are as follows: L41, the distance of the front surface of lens 15 from the facet of the laser diode, is 1.09 mm; L42, the effective focal length of lens 15, is 2.00=0.03 mm; and L43, the maximum diameter of lens 15, is 3.000=0.015 mm. The lens material is C0550 Glass. The numerical aperture is 0.50, and the clear aperture is 2.00 mm. The radius of SURF5 is 2.910361 mm, and the radius of SURF6 is −1.499999 mm. The sag of SURF5 is represented by the conic constant $(1-e^2)=-0.645786$, with the additional higher order non-zero coefficients being $a_4=-0.0944102$, $a_6=0.127642$, and $a_8=-0.0816437$. (The equation for the sag, z, of a surface in the general case is given by:

$$z=cy^2/[1+(1-(1-e^2)c^2y^2)^{0.5}]+a_4y^4+a_6y^6+a_8y^8+\ldots)$$

Figure 5:
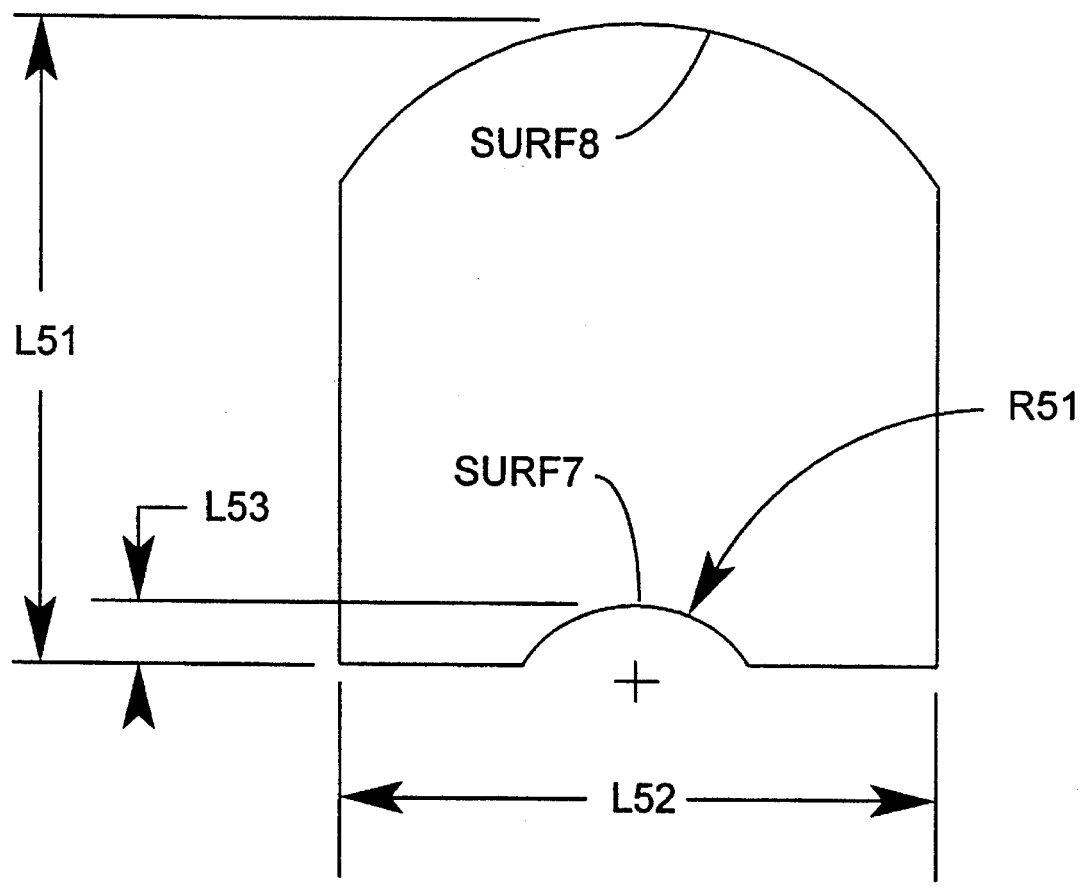
FIG. 5 shows a minilens according to the invention for use with the molded aspheric lens of FIG. 4.

Shown in FIG. 5 is a cross-section of a monolithic cylindrical micro-telescope, which can be used as lens 17, and which is used in conjunction with lens 15 specified above. The various dimensions of the cross-section of lens 17 are as follows: L51, the physical length, is 2.200 mm; L52, the physical width of the lens, is 2.00 mm; R51, the radius of curvature of SURF7 is 0.318 mm; and L53, is 0.2 mm. The lens material is F2 glass, and the separation of lens 17 from lens 15 is nominally 1 mm. The sag of SURF9 is represented by the non-zero expansion coefficients being $a_2=-0.4634408$, $a_4=-0.0720862$, $a_6=-0.0248088$, and $a_{10}=-0.01136959$.

Figures 6A, 6B:
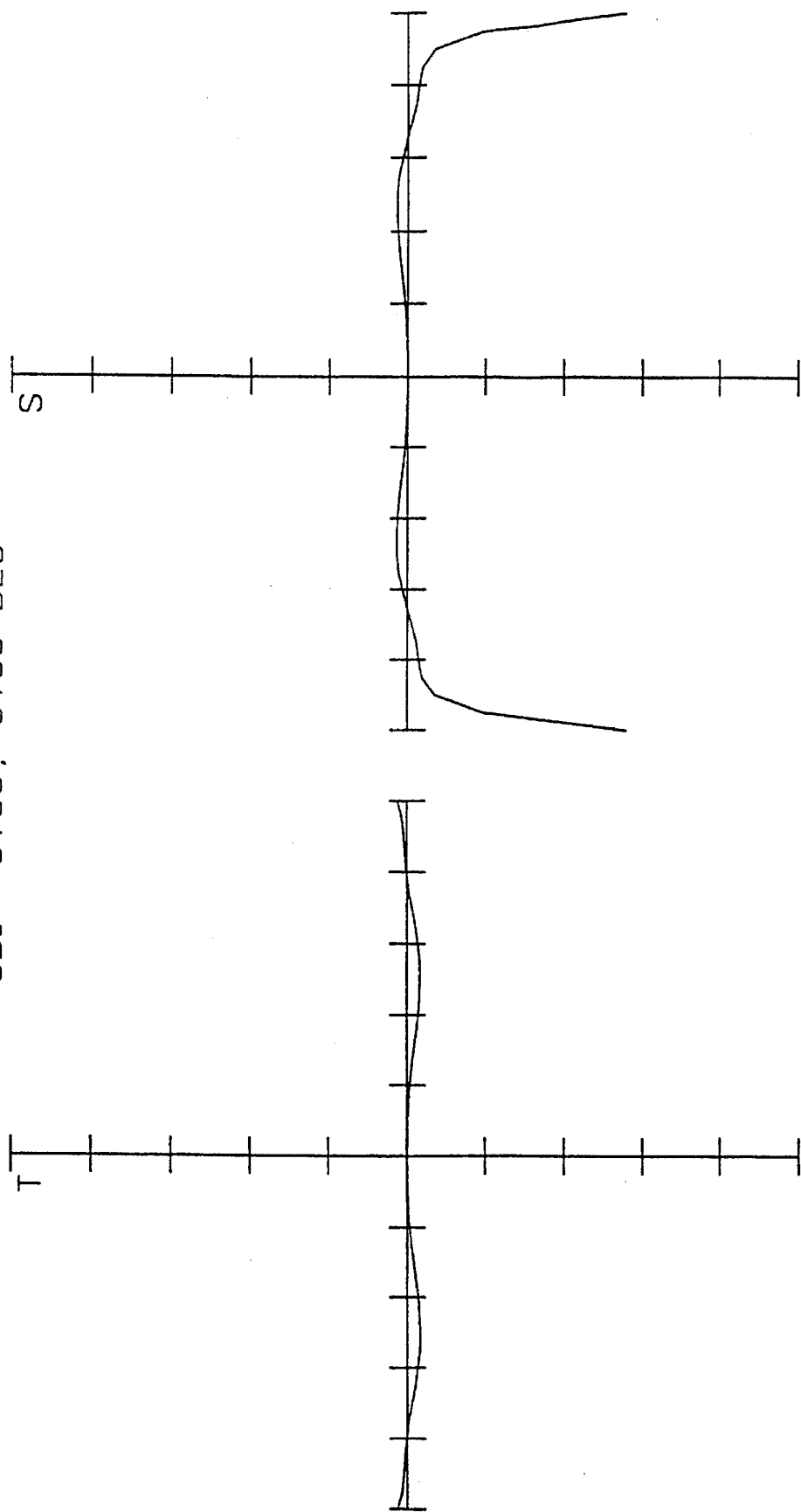
FIGS. 6A and 6B illustrate the optical path difference on the transverse and sagittal axes of the external hybrid collimator lens combination, respectively.
Figure 7:
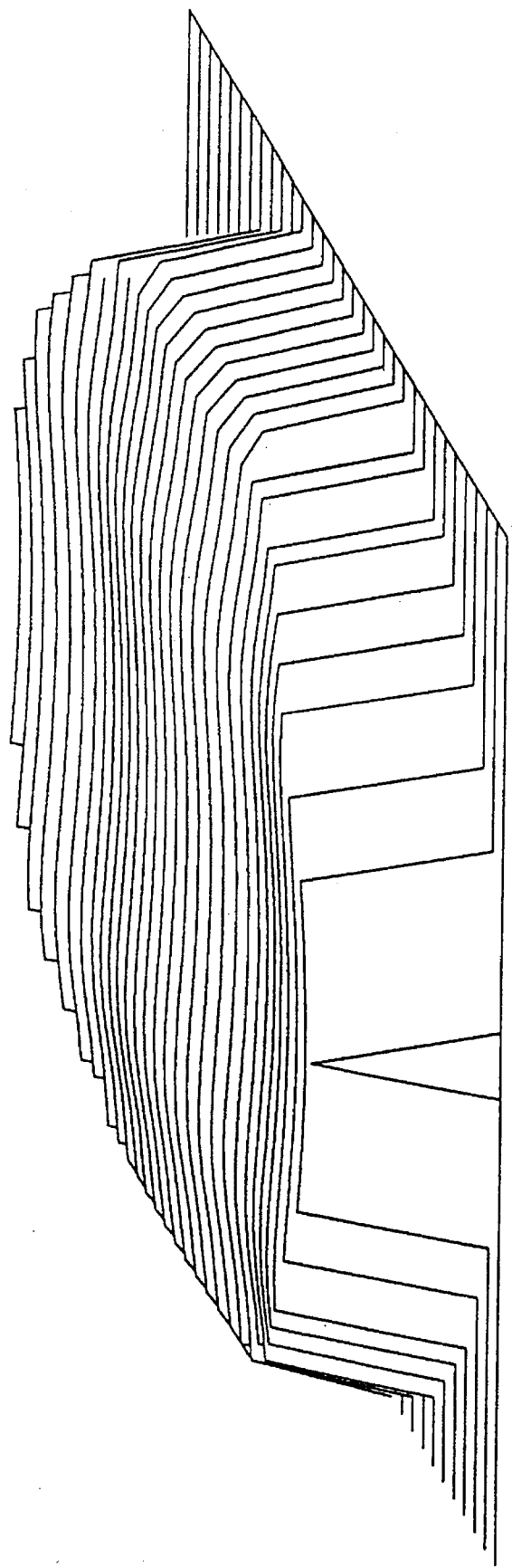
FIG. 7 shows a graph of the wavefront profile when using an external hybrid collimator according to the invention.

As a measure of the performance of the combination of lens 15 and 17, FIGS. 6A and 6B illustrate the optical path difference on the transverse and sagittal axes, respectively, for the beam exiting lens 17 when using a wavelength of 670 nanometers. The maximum scale for FIGS. 6A and 6B is −0.1000 to 0.1000 waves. FIG. 7, is a computer generated picture of the wavefront function at 670 nanometers which shows the flatness of the field of the beam exiting lens 17, and demonstrates the quality of the lens combination in achieving collimation. The peak to valley in FIG. 7 is 0.0600 waves.

Figure 8:
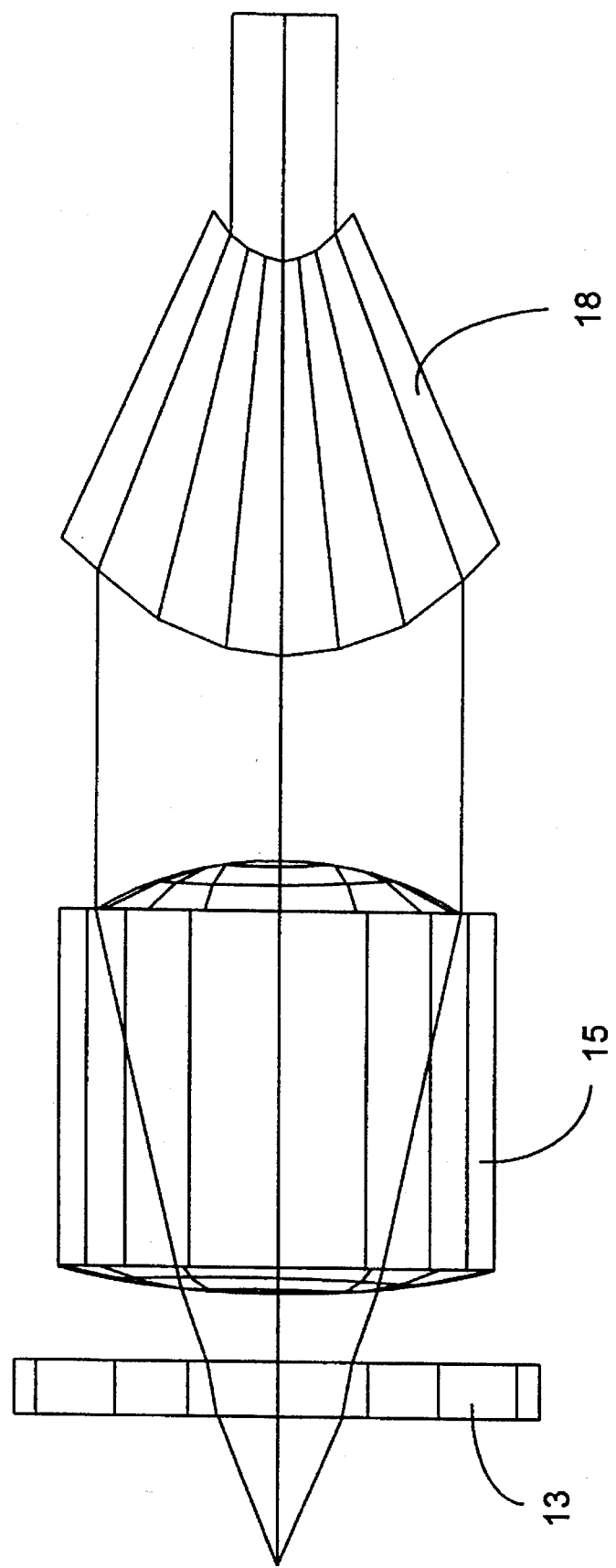
FIG. 8 shows another external hybrid collimator lens combination according to the invention.

Those skilled in the art will understand that there are many different combinations of lens surfaces for lens 17 which can accomplish the same function. For example, rather than a square aspect ratio for the cross-section of lens 17, one might decide for space accommodation reasons to shorten the lens from front to back, or perhaps a different kind of glass might be important for its optical characteristics. Another approach would be to collimate and circularize the diode laser beam down to the small axis rather than the large axis as illustrated previously. That configuration is illustrated in FIG. 8, which shows a Corning asphere 15 as before, but with a lens 18, which is similar to lens 17, but used in reverse. The specifics of the lens design for lens 18 are not identical to those of lens 17, but to optimize this configuration is easily within the capabilities of modern ray tracing programs.

All of these kinds of variations will change the specific dimensions and curvatures of the optical surfaces of the lens. However, these variations are meant to be included in the broadest concept of the invention, which is presented in the appended claims.

I claim:

1. A monolithic optic comprising:

a cylindrical lens comprised of a transparent material, said lens having a longitudinal axis, an optical axis orthogonal to said longitudinal axis, and a constant cross-section in a plane orthogonal to said longitudinal axis, said lens having a negative power cylindrical surface and having a positive power cylindrical surface opposite said negative power cylindrical surface, wherein said negative power cylindrical surface and said positive power cylindrical surface have focal lines that substantially coincide.

2. An optic as in claim 1 wherein said cylindrical lens has a maximum cross-sectional dimension of less than 5 mm but greater than 0.5 mm.

3. An optic as in claim 1 wherein said negative power is larger than said positive power in absolute magnitude.

4. An optic as in claim 1 wherein said cylindrical lens is a pulled lens.

5. An optic as in claim 4 wherein said cylindrical lens has a maximum cross-sectional dimension of less than 5 mm.

6. A lens system comprising:

an axially symmetric collimating lens having an optical axis; and a monolithic cylindrical afocal lens, said cylindrical lens having a longitudinal axis and a constant cross-section in a plane orthogonal to said longitudinal axis, and having an optical axis coincident with said optical axis of said collimating lens, wherein said optical axis of said cylindrical afocal lens is orthogonal to the longitudinal axis of said cylindrical afocal lens.

7. A lens system as in claim 6 wherein said cylindrical afocal lens comprises a cylindrical lens comprised of a transparent material, said cylindrical lens having a negative power cylindrical surface and having a positive power cylindrical surface opposite said negative power cylindrical surface, wherein said negative power cylindrical surface and said positive power cylindrical surface have focal lines that substantially coincide.

8. A lens system as in claim 7 wherein said negative power cylindrical surface of said afocal lens is arranged for receiving light from said axially symmetric collimating lens, so that light from said negative power cylindrical surface impinges on said positive power cylindrical surface.

9. A lens system as in claim 7 wherein said positive power cylindrical surface of said afocal lens is arranged for receiving light from said axially symmetric collimating lens, so that light from said positive power cylindrical surface impinges on said negative power cylindrical surface.

10. A lens system as in claim 7 wherein said cylindrical afocal lens has a maximum cross-sectional dimension of less than 5 mm.

11. A lens systems as in claim 7 wherein said negative power is larger than said positive power in absolute magnitude.

12. An optic as in claim 4 wherein said negative power is larger than said positive power in absolute magnitude.

* * * * *